United States Patent
Aoki et al.

(10) Patent No.: US 9,116,309 B2
(45) Date of Patent: Aug. 25, 2015

(54) OPTICAL CONNECTOR

(71) Applicants: FUJITSU LIMITED, Kawasaki-shi, Kanagawa (JP); FURUKAWA ELECTRIC CO., LTD., Tokyo (JP)

(72) Inventors: Tsuyoshi Aoki, Machida (JP); Shigenori Aoki, Atsugi (JP); Hidenobu Muranaka, Atsugi (JP); Katsuki Suematsu, Tokyo (JP); Mitsuhiro Iwaya, Tokyo (JP)

(73) Assignees: FUJITSU LIMITED, Kawasaki (JP); FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 14/288,756

(22) Filed: May 28, 2014

(65) Prior Publication Data

US 2014/0363129 A1    Dec. 11, 2014

(30) Foreign Application Priority Data

Jun. 7, 2013    (JP) .................................. 2013-121049

(51) Int. Cl.
  *G02B 6/26*    (2006.01)
  *G02B 6/38*    (2006.01)
  *G02B 6/42*    (2006.01)

(52) U.S. Cl.
  CPC ............ *G02B 6/3855* (2013.01); *G02B 6/3883* (2013.01); *G02B 6/3882* (2013.01); *G02B 6/3893* (2013.01); *G02B 6/4292* (2013.01)

(58) Field of Classification Search
  None
  See application file for complete search history.

(56) References Cited

U.S. PATENT DOCUMENTS

| 2011/0243504 A1 | 10/2011 | Matsui |
| 2012/0237168 A1 | 9/2012 | Aoki |
| 2012/0301082 A1 | 11/2012 | Bitter et al. |

FOREIGN PATENT DOCUMENTS

| JP | 2001-215364 A1 | 8/2001 |
| JP | 2011-215364 A1 | 10/2011 |
| JP | 2012-194481 A1 | 10/2012 |

OTHER PUBLICATIONS

Office Action mailed on May 25, 2015 issued with respect to the corresponding Taiwanese Patent Application No. 103119070. Partial translated office action CA.

*Primary Examiner* — Ryan Lepisto
*Assistant Examiner* — Erin Chiem
(74) *Attorney, Agent, or Firm* — Kratz, Quintos & Hanson, LLP (57) ABSTRACT

An optical connector includes an optical fiber, and a ferrule configured to hold the optical fiber, wherein the ferrule has a front part, a rear part, a deformable mechanism to connect between the front part and the rear part, and an opening to allow the optical fiber to bend along with displacement of the deformable mechanism, and wherein the deformable mechanism has a restrictor to restrict the displacement or deformation of the deformable mechanism, the restrictor being provided at least between the deformable mechanism and the front part or between the deformable mechanism and the rear part.

14 Claims, 13 Drawing Sheets

FIG.1

(C) B-B' CROSS-SECTION

(C) D-D' CROSS-SECTION

(C) D-D' CROSS-SECTION

(C) B-B' CROSS-SECTION

OPTICAL CONNECTOR

CROSS-REFERENCE TO RELATED APPLICATIONS

This application is based upon and claims the benefit of priority of the prior Japanese Patent Application No. 2013-121049 filed on Jun. 7, 2013, which is incorporated, herein by references in its entirety.

FIELD

The embodiments discussed herein relate to an optical connector.

BACKGROUND

In recent years and continuing, optical interconnections likely to provide wideband inter-chip communications at low power-consumption have been attracting attention in the technologies of supercomputers or servers.

In supercomputers or servers, multiple boards are connected to a backplane board and a large-scale integration (LSI) chip is mounted on each board to carry out computation. With optical interconnections, electrical signals generated by the LSI chip are converted into optical signals by an electrical-to-optical converter on the board. The optical signals are transmitted to another board and converted into electrical signals before they are input to the LSI chip. Optical transmission paths are arranged on or inside the backplane board. Optical transmission paths are also arranged on each board, extending from the board edge to the optical-to-electrical converter and the electrical-to-optical converter. The boards are each connected to the backplane board using optical connectors.

Optical connectors for use in connection with the backplane board are generally placed at the board edges. In general, multifiber optical connectors are used and an attachable and detachable structure is employed from the viewpoint of the system configuration and system maintenance. In an optical connector, an optical transmission line is held by a ferrule with a high degree of accuracy and housed in a connector housing. The ferrule is mated with a counterpart ferrule in the connector housing.

For optical connectors, cost redaction, as well as quality improvement, is desired. To reduce manufacturing cost, unpolished fibers with their tips unpolished have promise. A connector structure enabling to achieve accurate optical connection between unpolished fibers is known. See, for example, Japanese Laid-open Patent Publication No. 2012-194481. This connector structure makes use of deformation of the ferrule and bending or buckling of optical fibers, and achieves low-loss connection between multifiber connectors, each having uneven fiber lengths.

However, with the conventional structure making use of ferrule deformation and fiber buckling, undesirable external forces such as shaking or impingement may be applied to the bending optical fibers during connection of the ferrules inside the connector housing. If an external force acts in the direction of the ferrule insertion (parallel to the light propagation axis of an optical fiber), buckling exceeding a specified level occurs at the optical fibers. If an external force acts in the direction of the fiber alignment (orthogonal to the light propagation axis of the optical fiber), the bending fibers are subjected to excessive stress and optical fibers may be damaged.

It is desired for an optical connector to prevent an excessive amount of buckling or stress from being generated in optical fibers over a specified level to avoid damage to the optical fibers.

SUMMARY

According to an aspect of the embodiments, an optical connector includes an optical fiber and a ferrule configured to hold the optical fiber, wherein the ferrule has a front part, a rear part, a deformable mechanism to connect between the front part and the rear part, and an opening to allow the optical fiber to bend along with displacement of the deformable mechanism, and wherein the deformable mechanism has a restrictor to restrict displacement or deformation of the deformable mechanism, the restrictor being provided at least between the deformable mechanism and the front part or between the deformable mechanism and the rear part.

The object and advantages of the invention will be realized and attained by means of the elements and combinations particularly pointed out in the claims. It is to be understood that both the foregoing general description and the following detailed description are exemplary and explanatory and are not restrictive to the invention as claimed.

DESCRIPTION OF EMBODIMENTS

The embodiments of the inventions are now described with reference to accompanying drawings.

First Embodiment

Figure 1:
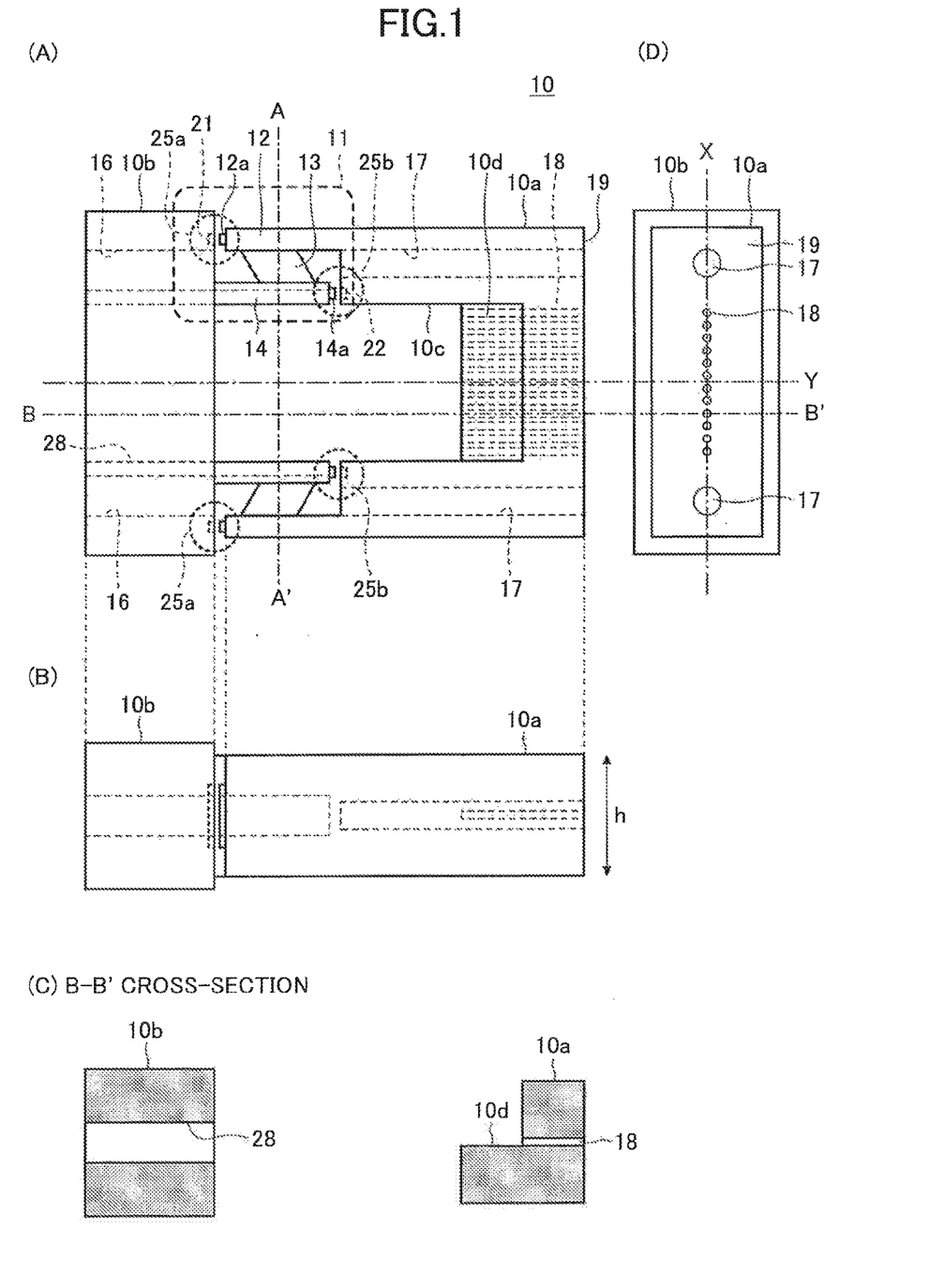
FIG. 1 illustrates a ferrule used in an optical connector according to the first embodiment.

FIG. 1 illustrated in orthogonal views a ferrule 10 used in an optical connector according to the first embodiment. In the figure, part (A) is a top view of the ferrule, part (B) is a side view, part (C) is a cross-sectional view taken along the B-B' line of the part (A), and part (D) is a front view.

The ferrule 10 has a front part 10a with a mating face 19, a rear part 10b, an opening 10c, and a deformable mechanism 11 connecting the front part 10a and the rear pars 10b. In this example, two deformable mechanisms 11 are provided at symmetrical positions with respect to the ferrule insertion, axis (i.e., the Y axis).

Fiber guide holes 18 are formed in the front part 10a and the rear part 10b of the ferrule 10. The front part 10a has a step 10d for supporting the optical fibers 31 (see FIG. 3) positioned in the opening 10c. The opening 10c allows the optical fibers 31 to buckle or bend during connection with the counterpart connector. The front part 10a has a guide pin receiving hole 17, and the rear part 10b has a guide pin receiving hole 16 and an adhesive inlet 28.

The deformable mechanism 11 has restrictors 25a and 25b to restrict displacement and/or deformation of the deformable mechanism 11 over a certain level. The restrictor 25a is provided between the deformable mechanism 11 and the rear part 10b of the ferrule 10. The restrictor 25b is provided between the deformable mechanism 11 and the front part 10a of the ferrule 10. When the ferrule 10 is mated with a counterpart ferrule (or connector), the restrictors 25a and 25b prevent too much buckling generated in the optical fibers 31 over a specified level and prevent an excessive amount of stress from being applied to the optical fibers 31 bending in the opening 10c.

The deferrable mechanism 11 includes a first restricting member 12 extending from the front part 10a to the rear part 10b of the ferrule 10, a second restricting member 14 extending from the rear part 10b to the front part 10a of the ferrule 10, and a beam 13 extending obliquely between the first restring member 12 and the second restricting member 14. The deformable mechanism 11 of this example has an N-shaped or Z-shaped top view, and the restrictors 25a and 25b are arranged symmetrically with, respect to the Y-axis direction of the ferrule 10.

Figure 2A:
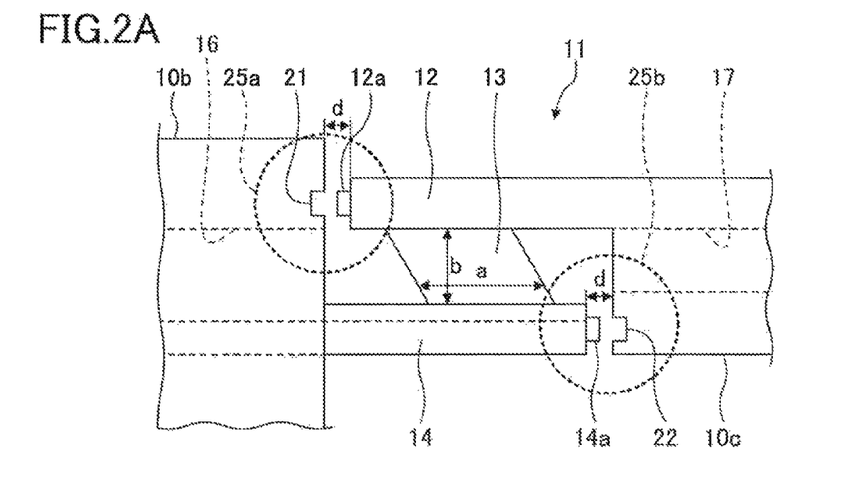
FIG. 2A is an enlarged view of the deformable mechanism of the ferrule.
Figure 2B:
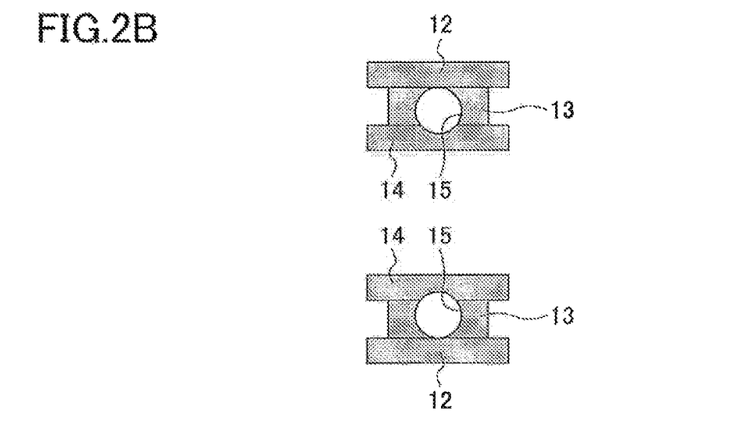
FIG. 2B is a cross-sectional view taken along the A-A' line of FIG. 1.
Figure 2C:
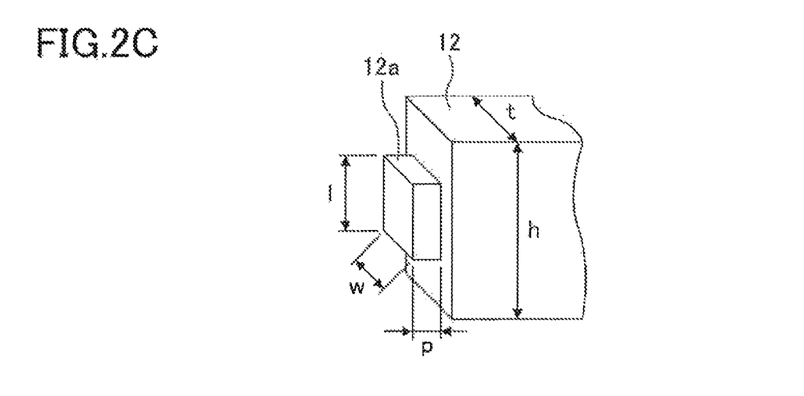
FIG. 2C is a perspective view of the first restricting member used in the deformable mechanism.

FIG. 2A is an enlarged view of the deformable mechanism 11, FIG. 2B is a cross-sectional view taken along the A-A' line of FIG. 1, and FIG. 2C is a perspective view of the first restricting member 12. The restrictor 25a has a protrusion 12a formed on the end face of the first restricting member 12 and a recess 21 formed in the rear part 10b of the ferrule 10. A clearance (or a gap) is provided between the first restricting member 12 and the rear part 10b of the ferrule 10. The restrictor 25b has a protrusion 14a formed on the end face of the second restricting member 14 and a recess 22 formed in the front part 10b of the ferrule 10. A clearance (or a gap) is provided between the second restricting member 14 and the front part 10a of the ferrule 10.

As illustrated in FIG. 2C, the first restricting member 12 has a same height "h" as that of the ferrule 10 and a thickness "t." in the X direction of FIG. 1. The protrusion 12a provided on the end face of the first restricting member 12 has a length "l" in the height "h" direction of the first restricting member 12, a width "w" in the thickness "t" direction, and a protruding amount "p". The recess 21 formed in the rear part 10b of the ferrule 10 is a groove for receiving the protrusion 12a. The same structures are employed for the protrusion 14a on the end face of the second restricting member and the recess 22 formed in the front part 10a of the ferrule 10.

The beam 13 extending obliquely between the first restricting member 12 and the second restricting member 14 has dimensions "a" in the ferrule inserting direction (Y direction) and "b" along the line of the fiber guide holes 18 (in the X direction) in the top view.

In the disconnected state of the optical connector, a clearance with a distance "d" exists in each of the restrictors 25a and 25b.

During connection of the optical connector, the protrusion 12a is fit into the recess 21, while the protrusion 14a is fit into the recess 22, and there is no clearance. Without the clearance, the deformable mechanism 11 cannot move or deform any longer. In this state, the beam 13 undergoes deformation due to the stress.

A guide pin receiving hole 15 is formed in the beam 13 (FIG. 2B). The diameter of the guide pin receiving hole 15 is the same as or less than that of the guide pin receiving hole 16 formed in the rear part 10b of the ferrule 10. On the other hand, the diameter of the guide pin receiving hole 15 is set greater than that of the guide pin receiving hole 17 formed in the front part 10a of the ferrule 10 such that the guide pin is held at a proper position even if the beam 13 undergoes deformation.

Figure 3:
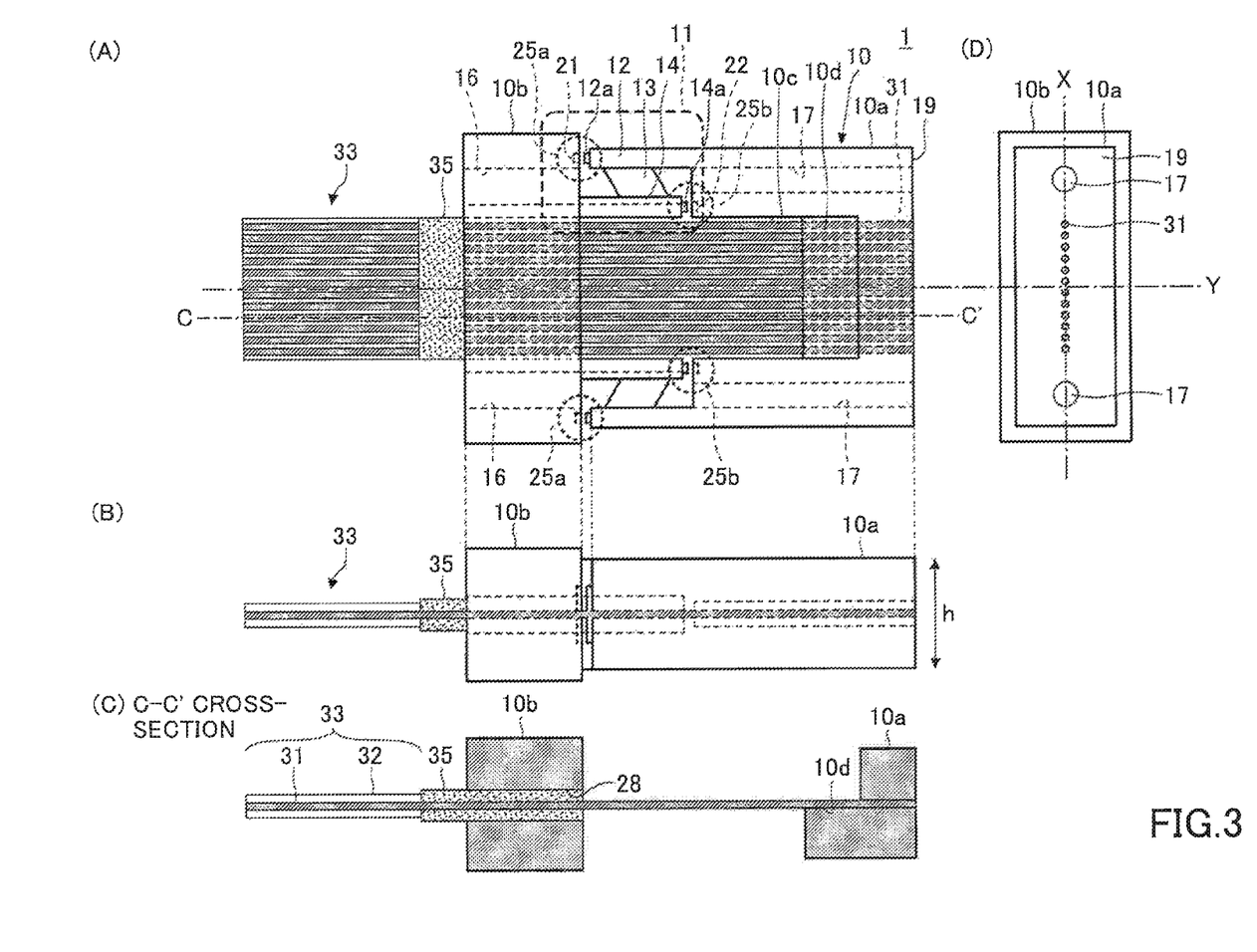
FIG. 3 illustrates an optical connector in which optical fibers are inserted in the ferrule.

FIG. 3 illustrates in orthogonal views the optical connector 1 in which the optical fibers 31 are inserted in the ferrule 10. Part (A) is a top view of the optical connector 1, part (B) is a side view, part (C) is a cross-sectional view taken along the C-C' line of part (A), and part (D) is a front view.

The optical connector 1 is, for example, a multifiber connectors in which two or more optical fibers 31 are used. The optical fibers 31 arranged in a line are held collectively by a tape 32 except for the end portions and define an optical transmission line 33. The optical transmission line 33 is secured by an adhesive 35. Each of the optical fibers 31 of the non-taped, portion is inserted in the corresponding one of the fiber guide holes 18 (FIG. 1), and supported on the step 10d of the front part 10a of the ferrule 10. The optical fibers 31 are unpolished fibers and the end tips of the optical fibers 31 vary in the length. The variation in the length is absorbed in the opening 10c of the ferrule 10 during connection of the optical connector 1.

Figure 4:
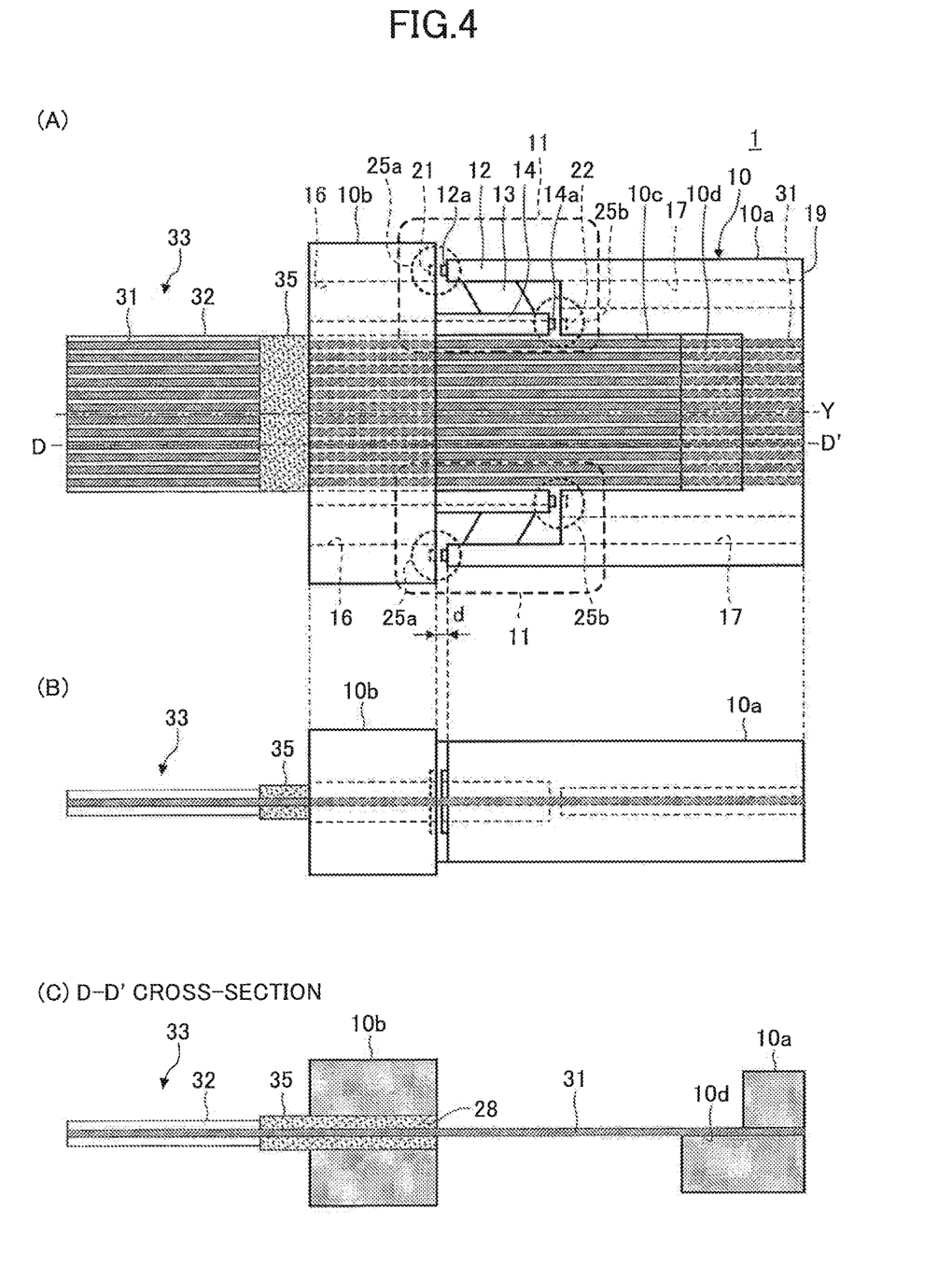
FIG. 4 illustrates in three views of the optical connector in the unconnected state.
Figure 5:
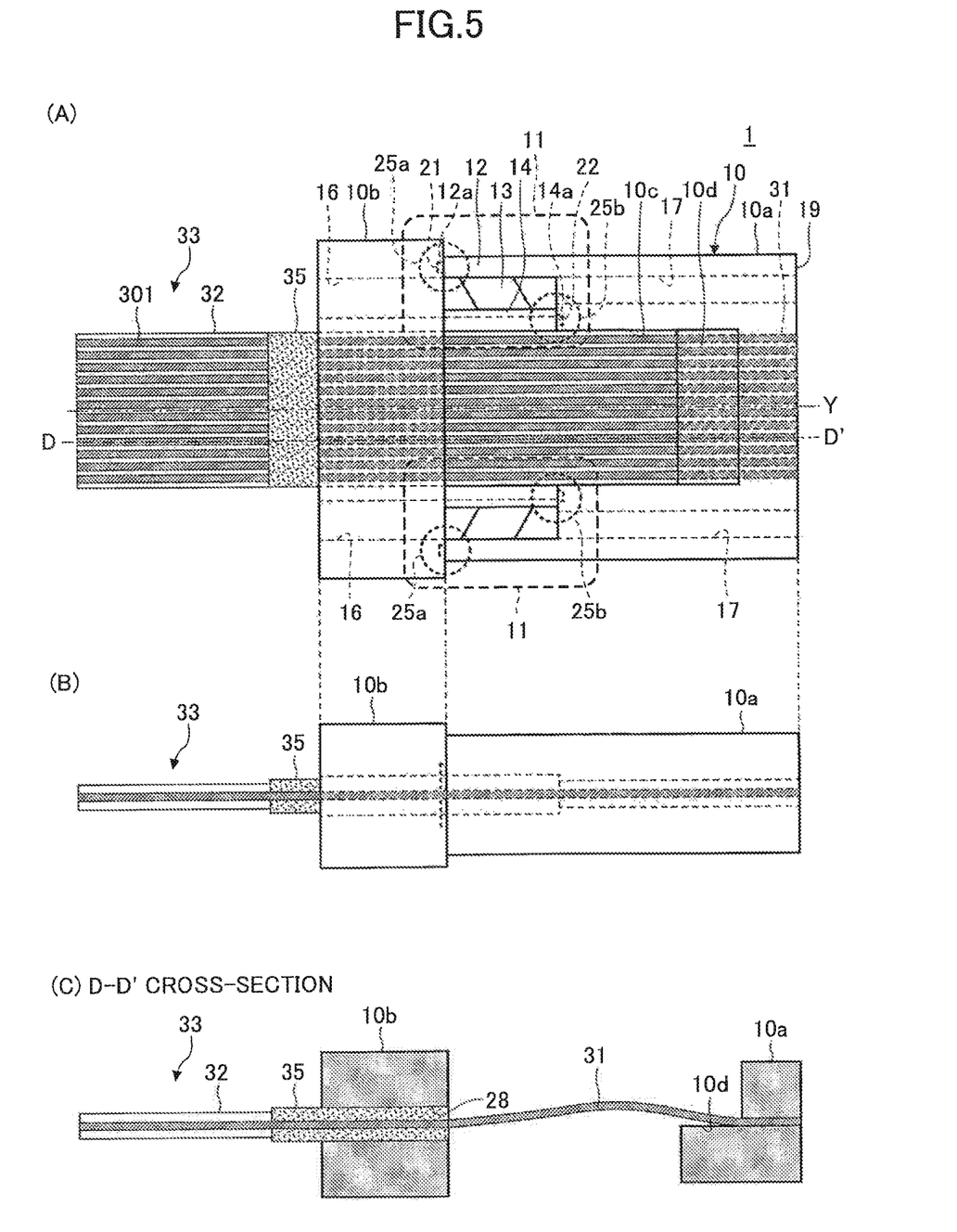
FIG. 5 illustrates in three views of the optical connector in the connected state.

FIG. 4 illustrates the optical connector 1 in the disconnected state, and FIG. 5 illustrates in three views the optical connector 1 in the connected state. In each of FIG. 4 and FIG. 5, part (A) is a top view, part (B) is a side view, and part (C) is a cross-sectional view taken along the D-D' line of part (A).

In the disconnected state illustrated in FIG. 4, a clearance with a distance "d" exists in each of the restrictors 25a and 25b. In this state, the optical fibers 31 projecting from the tape 32 of the transmission line 33 extend straight in the ferrule 10 as illustrated in part (C) of FIG. 4.

In the connected state illustrated in FIG. 5, the protrusion 12a is fit into the recess 21 at the restrictor 25a, while the protrusion 14a is fit into the recess 22 at the restrictor 25b (see FIG. 2A), and there is no clearance left. The tips of the optical fibers 31 come into contact with she optical fibers of the counterpart connector and physical-contact (PC) connection is achieved. Even with variation in the length of the optical fibers 31, all the optical fibers 31 can be brought into physical-contact connection because the optical fibers 31 bend (or buckle) in the opening 10c of the ferrule 10, as illustrated in part (C) of FIG. 5.

Figure 6:
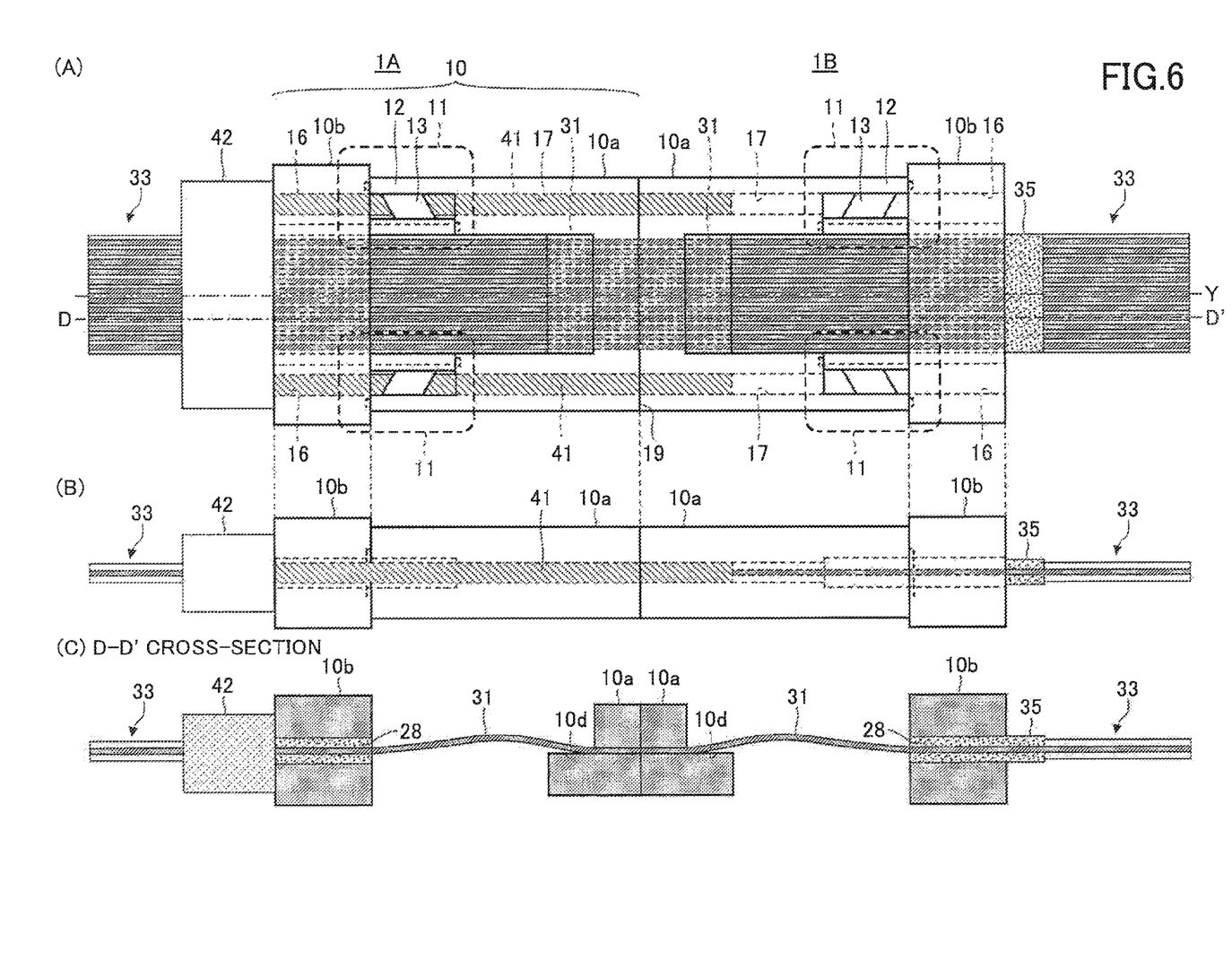
FIG. 6 illustrates two optical connectors mated with each other.

FIG. 6 illustrates an optical connector 1A and an optical connector 1B mated with each other. The optical connector 1A has a guide pin 41. The guide pin 41 is held by pin keeper 42. When the optical connector 1A is connected to the optical connector 1B, the leading end of the guide pin 41 is inserted into a guide pin receiving hole 17 of the optical connector 1B.

The optical connector 1A and the optical connector 1B are pressed against each other, and the beam 13 of the deformable mechanism 11 of each of the optical connectors 1A and 1B warps. Because the diameter of the guide pin receiving hole 16 of the rear part 10b of the ferrule 10 and the diameter of the guide pin receiving hole 15 of the beam 13 are set greater than that of the guide pin 41, the optical connectors 1A and 1B are positioned correctly with respect to each other by the guide pin 41.

The optical fibers 31 of the optical connector 1A and the optical fibers 31 of the optical connector 1B are brought into physical contact, while bending in the height direction of the ferrule 10. Even if an unexpected force is applied externally to the bending optical fibers 31, excessive buckling over a tolerable level can be prevented because farther displacement of the deformable mechanism 11 is restricted by the restrictors 25a and 25b.

In the connected state illustrated in FIG. 6, the internal stress spreads over the entire part of the beam 13 and the restricting members 12 and 14, and breakdown or breakage is prevented in relation to the material characteristics. Because of the interlock between the protrusion 12a and the recess 21 and between the protrusion 14a and the recess 22, the ferrules 10 are held stably even if an external force is applied in the direction parallel to the alignment of the optical fibers 31.

The above-described arrangements can prevent excessive force from being applied to the optical fiber 31 bending inside the ferrule 10 during connection and protect the optical fibers 31 from breakage.

[Example 1]

An actual example of fabricating the optical connector 1 with the above-described structure. The external dimensions of the optical connector 1 are the same as those of a mechanically transferable (MT) connector which is a standardized multifiber optical connector.

Referring to FIG. 2A to FIG. 2C, the height "h" of the first restricting member 12 of the restrictor 25a and the second restricting member 14 of the restrictor 25b is 2.5 mm, and the thickness "t" is 400 µm.

The distance "d" of the clearance between the first, restricting member 12 and the rear part 10b and between the second restricting member 14 and the front part 10a of the ferrule 10 is 100 µm.

The projection amount "p" of the protrusion 12a of the first restricting member 12 and the protrusion 14a of the second restricting member 14 is 50 µm. The length "l" of the protrusions 12a and 14a in the vertical direction of the drawing is 1 mm, and the width "w" is 200 µm. The depth of the recesses 21 and 22 is 50 µm, and the length and the width thereof are 1.01 mm and 201 µm, respectively.

The size "a" of the top face of the beam 13 in the ferrule inserting direction (along the Y axis in FIG. 1) is 1 mm, and the sire "b" of the beam 13 along the line of the fiber guide holes 18 (along the X axis in FIG. 1) is 700 µm. The height of the beam 13 in the height direction of the ferrule 10 is 1.5 mm. The angle of the beams 13 with respect to the first restricting member 12 and the second restricting member 14 is 45 degrees.

The diameter of the guide pin receiving hole 17 varies in the front part 10a of the ferrule 10. From the mating face 19 (FIG. 1) to 2 to 4 mm inside, the diameter is 701 µm which sire is almost the same as that of the guide pin receiving hole of an MT connector. The diameter of the guide pin receiving hole 17 becomes 800 µm deeper inside the front part 10a of the ferrule 10. The diameter of the guide pin receiving hole 16 of the rear part 10b of the ferrule 10 and the diameter of the guide pin receiving hole 15 of the beam 13 are also 800 µm.

The guide pin receiving hole 15 formed in the beam 13 is slightly offset toward the inner side of the ferrule 10 (or closer to the opening 10c) as illustrated in FIG. 2B. When using the deformable mechanism with an N-shaped or Z-shaped top view (FIG. 1), the guide pin receiving hole 15 deforms toward the outer side of the ferrule 10 as the first restricting member 12 and the second restricting member 14 deform along with the displacement of the deformable mechanism 11. If the guide pin 41 makes contact with the ferrule 10, a frictional resistance is generated and the body of the ferrule 10 will not indicate a desired spring constant. To avoid this, the diameter of the guide pin receiving hole 16 of the rear part 10b of the ferrule and the diameter of the guide pin receiving hole 15 of the beam 13 are set about 100 µm greater than the diameter of the guide pin 41. On the other hand, the diameter of the guide pin receiving hole 17 of the front part 10a of the ferrule 10 is set only 1 µm greater than the diameter of the guide pin 41 due to requirement for positioning accuracy with respect to the optical fibers of the counterpart connector.

The ferrule 10 can be fabricated by mold injection. For the molding material, an olefin resin group may be used as an example of engineering plastic. The material of the ferrule 10 is not limited to this example, and many other materials such as polyamide (PA), polycarbonate (PC), polyasetal (polyoxymethylene: POM), modified polyphenylene ether (m-PPE), polybutylene terephthalate (PBT), amorphous polyarilate (PAR), polyether sulphon (PES), polyphenylene sulfide (PPS), polyether ether ketone (PEEK), polyimide (PI), and polyetherimide (PEI) may be used. The ferrule 10 may be designed according to the mechanical characteristics of the material to be used.

Twelve optical fibers 31 are inserted in the ferrule 10. A 12-core fiber ribbon 33 is used as the transmission line 33. The tape 32 of the leading end portion of the fiber ribbon 33 is removed to expose individual optical fibers 31. Each of the optical fibers 31 is inserted independently into corresponding one of the fiber guide holes 18. The base portions of the independent optical fibers 31 are secured by adhesive 35.

The optical fiber 31 is, for example, a single-mode 125-micron fiber or a multi-mode fiber. The optical fiber 31 is not limited to this example, and other types of fibers such as small-diameter optical fibers, large-diameter optical fibers, hard plastic clad fibers (HPCF), or plastic optical fibers (POF) may be used.

As in the ordinary MT ferrule, the optical fibers 31 do not interfere with, any parts of the ferrule 10. The tips of the optical fibers 31 are cut by a fiber cutter, laser machining, arcing or any suitable means and left unpolished. In spite of the unpolished tips, the optical fibers 31 can be connected to the counterpart optical fibers of ordinary MT connectors or thin-film optical waveguides held in MPT connectors.

In the disconnected state of the optical connector 1, the tips of the optical fibers 31 slightly go backward inside the fiber guide holes 18 from the mating face 19 of the front part 10a of the ferrule 10. The variation in the length of the optical fibers 31 and the retracted position from the mating face 19 are within 100 µm (corresponding to the distance "d" of the clearance) which range is the deformable and deformable range of the deformable mechanism 11.

During connection of the optical connector 1, the optical fibers 31 slightly project from the fiber guide holes 18 and come into physical contact with the optical fibers of a counterpart connector. As described in the foregoing, the restrictors 25a and 25b of the deformable mechanism 11 prevent an excessive amount of buckling from being generated in the optical fibers 31 in the optical axis direction. Even if an external force is applied in the direction of alignment of the optical fibers 31, the bending optical fibers 31 are held stably in the ferrule 10.

[Modification 1]

Figure 7:
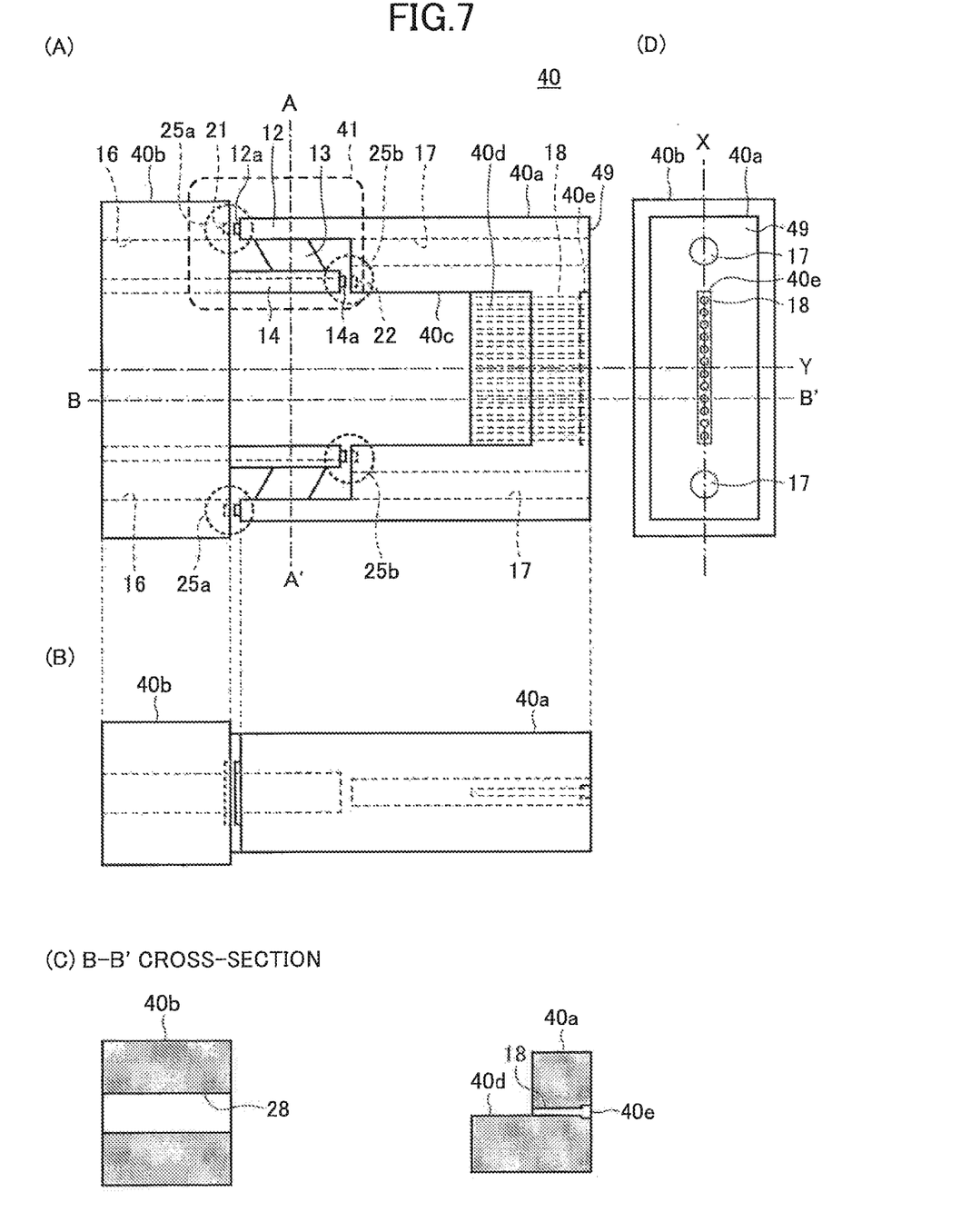
FIG. 7 illustrates a modification of the ferrule of FIG. 1.

FIG. 7 illustrates in four orthogonal views a ferrule 40 which is a modification of the ferrule 10 illustrated in FIG. 1. Part (A) is a top view, part (B) is a side view, part (C) is a cross-sectional view taken along the B-B' line of part (A), and part (D) is a front view. The basic structure of the ferrule 40, including the design of the deformable mechanism 11, is the same as that of the ferrule 10, and redundant explanation for those elements denoted by the same numerical symbols will be omitted. Although not depicted, the cross-sectional structure taken along the A-A' line of part (A) is also the same as that illustrated in FIG. 2A to FIG. 2C.

Figure 8A:
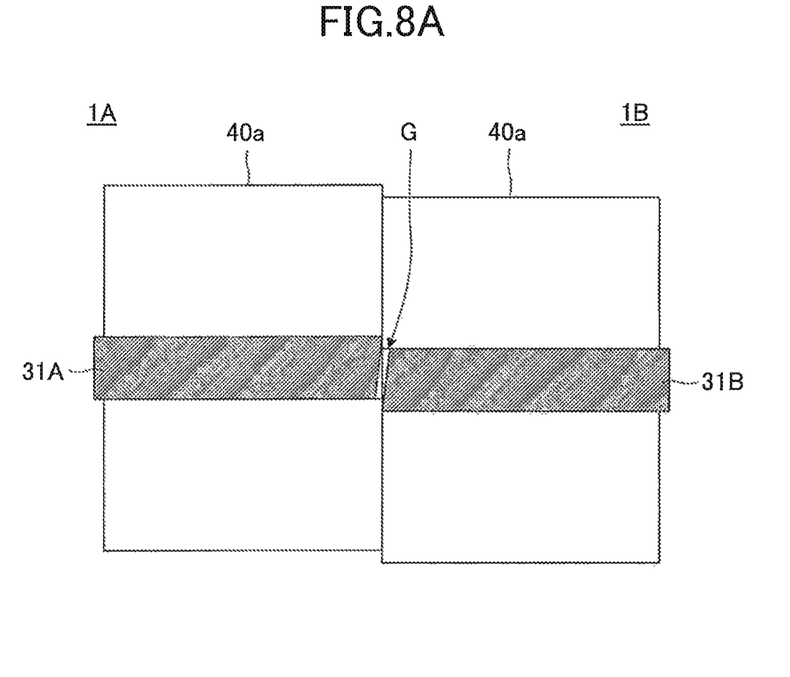
FIG. 8A is a diagram to explain an advantageous effect of the modification of FIG. 7.

The different part in the ferrule 40 is recesses 40e formed in the front part 40a of the ferrule 40 at positions from which fiber guide holes 18 are extending. If a slight amount of offset (or a manufacturing error) exists in the guide pin receiving hole 17 or fiber guide holes 18, neither optical fiber 31A nor optical fiber 31B can project from the mating face 49, as illustrated in FIG. 8A, during connection between optical connectors 1A and 1B. In this case, the optical fiber 31A and the optical fiber 31B may not come into physical contact due to gap "G" in spite of the fact that the angles of the end faces of the optical fibers 31A and 31B are within the acceptable range for physical-contact (PC) connection under a buckling load.

Figure 8B:
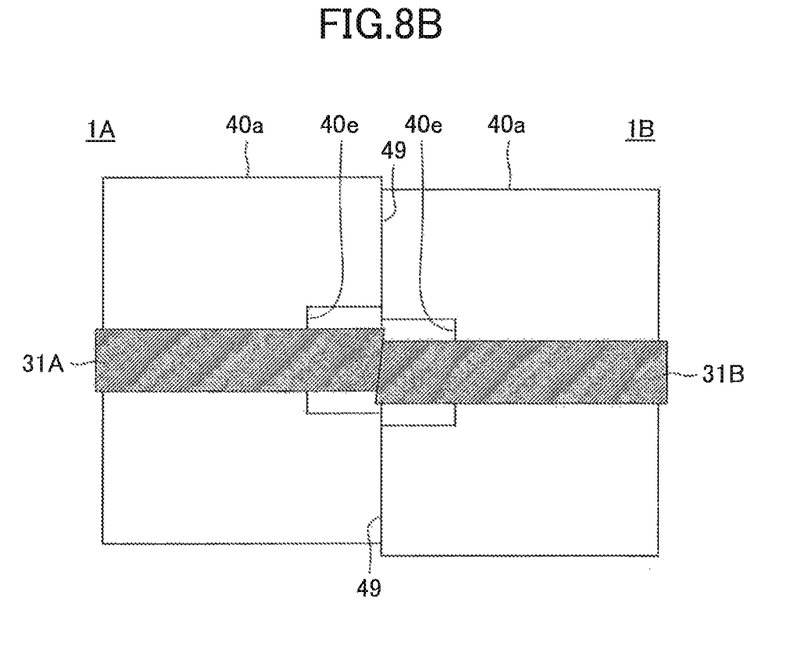
FIG. 8B is a diagram to explain an advantageous effect of the modification of FIG. 7.

To avoid this, a recess 40e is provided to a corresponding one of the fiber guide holes 18, at or near the mating face 49 of the ferrule 40, as illustrated in FIG. 8B. With the recesses 40e, the optical fiber 31A and the counterpart optical fibers 31B can be brought into physical contact even if a slight amount of offset is contained in the fiber guide holes 18.

Second Embodiment

Figure 9:
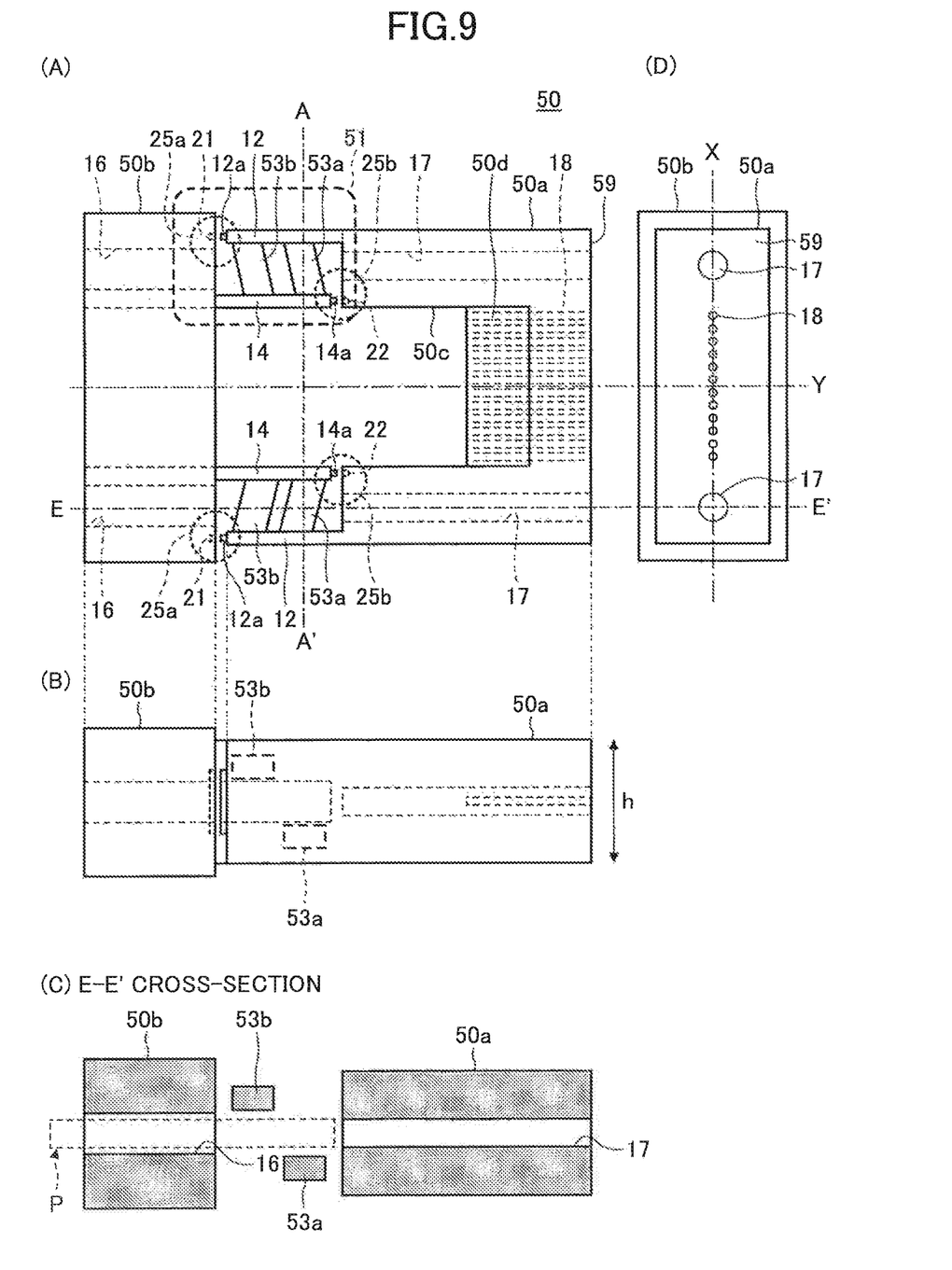
FIG. 9 illustrates a ferrule used in an optical connector according to the second embodiment.

FIG. 9 illustrates in four orthogonal views a ferrule 50 used in an optical connector according to the second embodiment. Part (A) is a too view, part (B) is a side view, part (C) is a cross-sectional view taken along the E-E' line of part (A), and part (D) is a front view.

The ferrule 50 has a deformable mechanism 51. The deformable mechanism 51 has a pair of beams 53a and 53b extending obliquely between a first restricting member 12 and a second restricting member 14.

Unlike the beam 13 illustrated in FIG. 2B, the beams 53a and 53b are separately positioned at a lower part and an upper part in the height "h" direction of the ferrule 50. In the example of FIG. 9, the beam 53a is positioned at a lower part and the beam 53b is positioned at an upper part in the height direction of the ferrule 50. A guide pin P depicted by the dashed line in the cross-sectional view of part (C) passes through the space between the upper beam 53b and the lower beam 53a. It is unnecessary to form a guide pin receiving hole in the beam 53a or the beam 53b.

Figure 10:
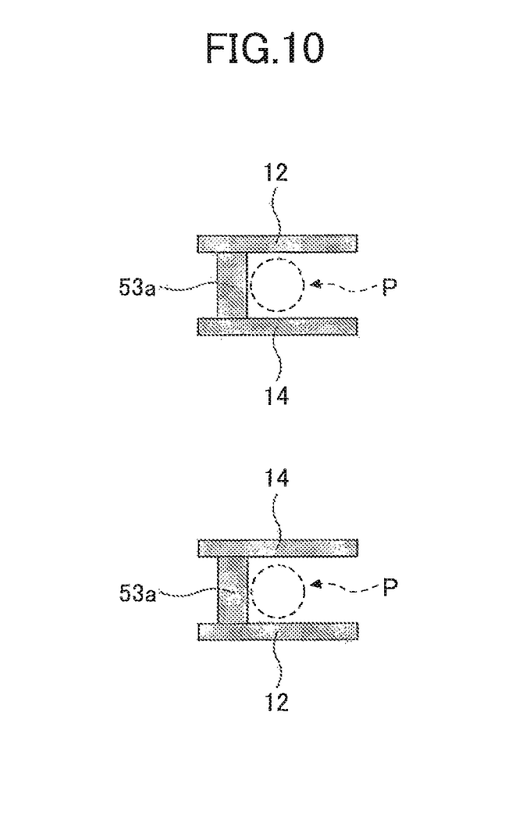
FIG. 10 is a cross-sectional view of the deformable mechanism of the ferrule taken along the A-A' line of FIG. 9.

FIG. 10 is a cross-sectional view of the beam 53a taken along the A-A' line of part (A) of FIG. 9. The beam 53a is connected to the first restricting member 12 and the second restricting member 14 under the position of the guide pin P. The other beam 53b is connected to the first restricting member 12 and the second restricting member 14 above the position of the guide pin P as illustrated in part (B) and part (C) of FIG. 9. By inserting the guide pin between the beams 53a and 53b, the deformable mechanism 51 is easy to deform.

The structures of the restrictors 25a and 25b are the same as those illustrated in FIG. 2A. Although the deformable mechanism 51 is designed so as to be more deformable, the restrictors 25a and 25b prevent excessive amounts of buckling stress from being applied to the optical fibers 31. Breakage of the optical fibers can be prevented advantageously as in the first embodiment.

Third Embodiment

Figure 11:
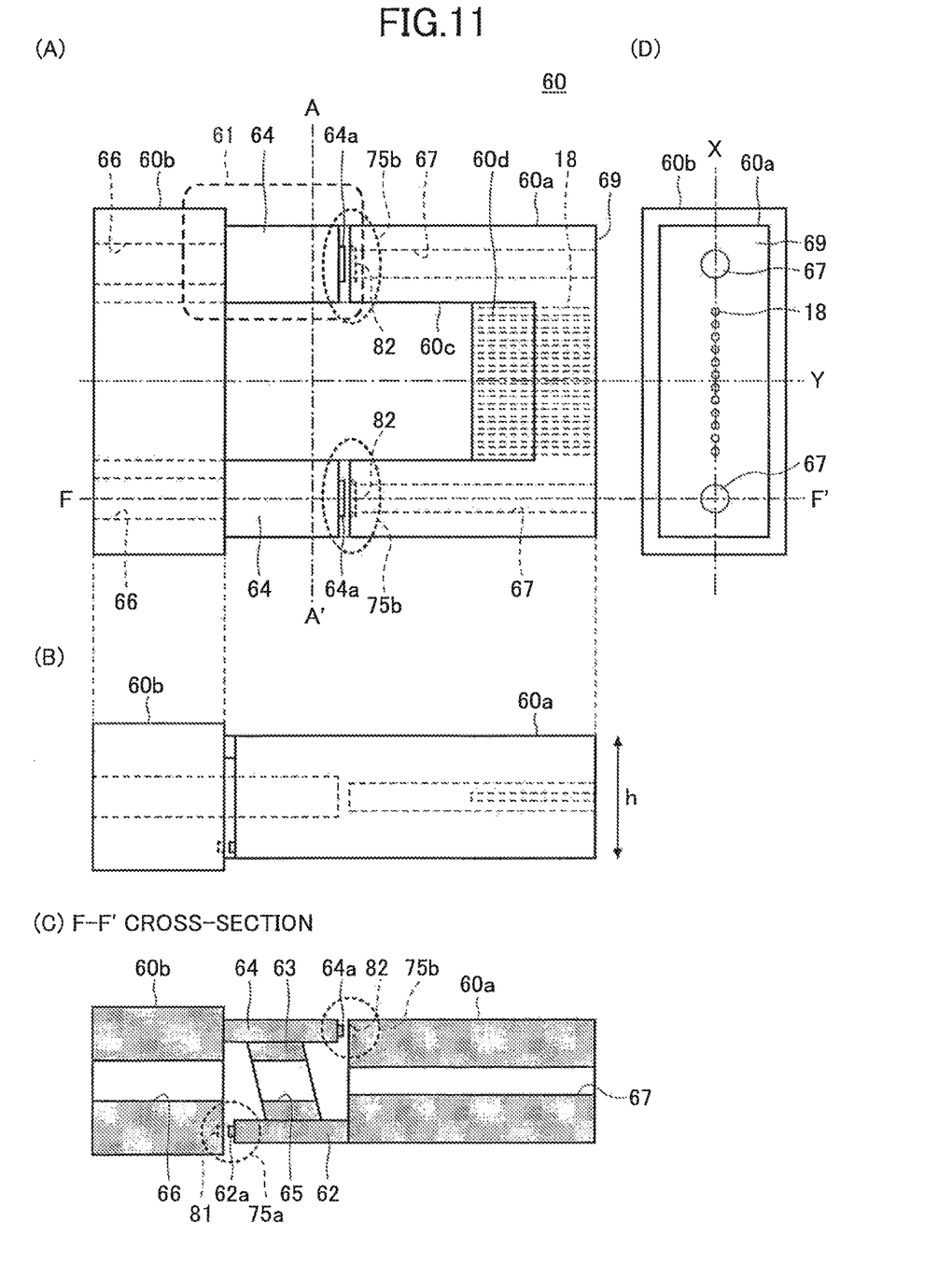
FIG. 11 illustrates a ferrule used in an optical connector according to the third embodiment.

FIG. 11 illustrates in four orthogonal views a ferrule 60 used in an optical connector according to the third embodiment. Part (A) is a top view, part (B) is a side view, part (C) is a cross-sectional view taken along the F-F' line of part (A), and part (D) is a front view of the ferrule 60.

The ferrule 60 has a front part 60a with a mating face 69, a rear part 60b, and an opening 60c. Fiber guide holes 18 and guide pin receiving holes 67 are formed in the front part 60a. Fiber guide holes 18 and guide pin receiving holes 66 are formed in the rear part 60b of the ferrule 60.

A deformable mechanism 61 is provided between the front part 50a and the rear part 60b of the ferrule 60. Two deformable mechanisms 61 are positioned symmetrically with respect to the insertion axis (or the Y axis) of the ferrule 60. The deformable mechanism 61 includes a first restricting member 62, a second restricting member 64, and a beam 63 obliquely extending between the first restricting member 62 and the second restricting member 64. In this example, the first restricting member 62 is positioned at a lower part in the height "h" direction of the ferrule 60 and extends from the front part 60a to the rear part 60b. The second restricting member 64 is positioned at an upper part in the height "h" direction of the ferrule 60 and extends from the rear part 60b to the front part 60a.

The deformable mechanism 61 has restrictors 75a and 75b. The restrictor 75a has a protrusion 62a formed on the end face of the first restricting member 62 and a recess 81 formed in the rear part 60b of the ferrule 60. The restrictor 75b has a protrusion 64a formed on the end face of the second restricting member 64 and a recess 82 formed in the front part 60b of the ferrule 60. In the third embodiment, the protrusions 62a and 64a and the recesses 81 and 82 extend parallel to the line of the optical fibers or fiber guide holes 18.

The beam 63 connects obliquely between the first restricting member 62 positioned at or near the bottom and the second restricting member 64 positioned at or near the top of the ferrule 60. A guide pin receiving hole 65 is formed in the beam 63.

Figure 12A:
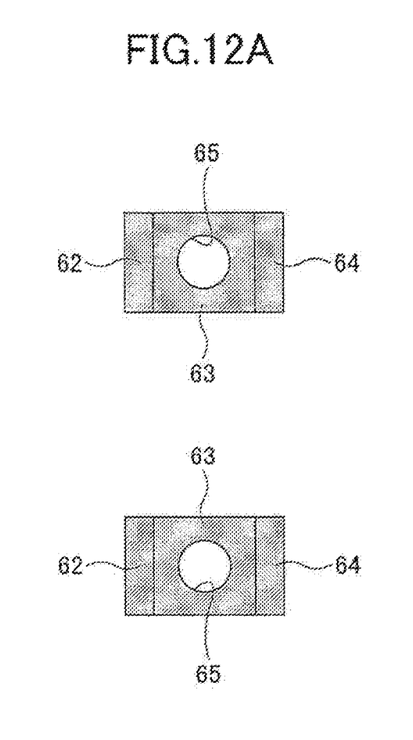
FIG. 12A is a cross-sectional view of the deformable mechanism of the ferrule taken along the A-A' line.

FIG. 12A is a cross-sectional view taken along the A-A' line of part (A) of FIG. 11. The guide pin receiving hole 65 is formed in the beam 63 extending between the first restricting member 62 and the second restricting member 64. The diameter of the guide pin receiving hole 65 is equal to or less than the diameter of the guide pin receiving hole 66 formed in the rear part 60b, and greater than the diameter of the guide pin receiving hole 67 of the front part 60a of the ferrule 60 (see FIG. 11).

Figure 12B:
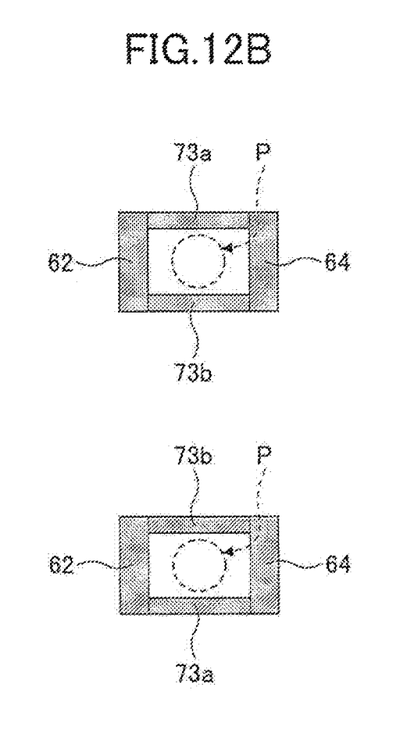
FIG. 12B illustrates in the same cross-section a modified structure of the deformable mechanism.

FIG. 12B illustrates a modification of the beam 63. In the modification, a pair of beams 73a and 73b extend parallel to each other between the first restricting member 62 and the second restricting member 64. The beam 73a and the beam 73b extend obliquely between the first restricting member 62 and the second restricting member 64 as illustrated in Part (C) of FIG. 11, while forming a space to receive a guide pin.

The guide pin is inserted between the beam 73a and the beam 73b at the position P of the circle indicated by the dashed line. It is unnecessary for this arrangement to form guide pin receiving holes in the beams 73a and 73b. In this example, thin beams 73a and 73b are used and the deformable mechanism 61 is easy to move or deform, while excessive displacement or deformation is prevented by the restrictors 75a and 75b.

Figure 13:
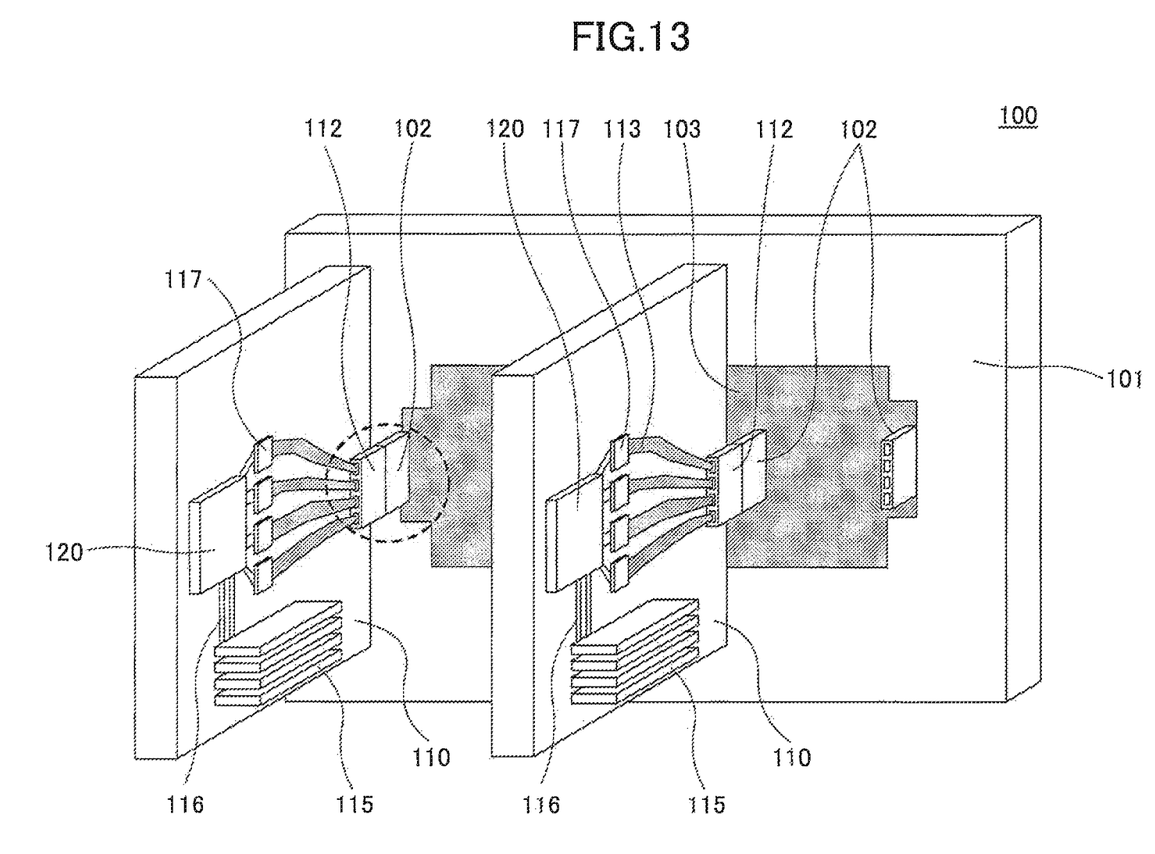
FIG. 13 is a schematic diagram of inter-board optical interconnection to which the optical connector of the embodiments are applied.

FIG. 13 is a schematic diagram illustrating optical interconnect 100 to which optical connectors of the embodiments (including the modifications) are applied. An optical transmission path 103 is formed on a backplane board 101, and optical connectors 102 are arranged at designated positions.

Multiple boards 110 are connected to the backplane board 101 in parallel to each other. On the board 110 are mounted electronic or optoelectronic devices such as an LSI chip 120, a memory 115, an optical-to-electric and electric-to-optical (abbreviated as "OE/EO") converter module 117. An optical connector 112 is provided at the edge of the board 110. An optical transmission path 113 is provided between the optical connector 112 and the OE/EO converter module 117, and electric interconnects 116 are provided between the OE/EO converter module 117 and the LSI chip 120 or the memory 115.

Each of the boards 110 is connected to the backplane board 101 in a disconnectable manner. When expanding the system or carrying out maintenance, the optical connector 112 is disconnected from the optical connector 102 and the board 110 is removed from the backplane board 101.

The connectors 102 and 112 may use any types of ferrules 10, 40, 50 and 60 described in the embodiments and modifications. Any types of the structures can prevent an excessive quantity of external force from being applied, to the optical fibers so as not to exceed a predefined deformation (e.g., 100 μm) even if too much load is applied in the ferrule inserting direction or the fiber aligning direction during connection or disconnection. The optical connectors of the embodiments may be connected to existing MT connectors or PMT connectors.

The structures of the first embodiment through the third embodiment may be combined with each other. The recess (FIG. 7) of the modification 1 may be applied to the ferrule of the second embodiment or the third embodiment. In the embodiment the restrictor 25a is provided between the deformable structure 11 and the rear part 10b of the ferrule 10 and the restrictor 25b is provided between the deformable structure 11 and the front part 10a of the ferrule 10. However, only one restrictor may be used. From the viewpoint of preventing stress on the optical fibers 31 in the fiber aligning direction, it is desired to provide restrictors 25a and 25b on either side of the ferrule. Ferrule 10, 40, 50 or 60 may be housed in a connector housing (not illustrated) and mated with a counterpart ferrule inside the connector housing.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization, of such examples in the specification relate to a showing of superiority or inferiority of the invention. Although the embodiments of the present inventions have been described in detail, it should be understood that the various changes, substitutions, and alterations could be made hereto without departing from the spirit and scope of the invention.

The invention claimed is:
1. An optical connector comprising:
an optical fiber; and
a ferrule configured to hold the optical fiber,
wherein the ferrule has a front part, a rear part, a deformable mechanism to connect between the front part and the rear part, and an opening to allow the optical fiber to bend along with displacement of the deformable mechanism, and
wherein the deformable mechanism has a restrictor to restrict the displacement or deformation of the deformable mechanism, the restrictor being provided at least between the deformable mechanism and the front or between the deformable mechanism and the rear part.

2. The optical connector according to claim 1,
wherein the restrictor has a clearance with a predefined distance between the deformable mechanism and the front part and between the deformable mechanism and the rear part, and
wherein a bending amount of the optical fiber in the opening is determined by the predefined distance of the clearance.

3. The optical connector according to claim 2, wherein the deformable mechanism has
a first restricting member extending from the rear part to the rear part of the ferrule;
a second restricting member extending from the rear part to the front part of the ferrule; and
a beam connecting the first restricting member and the second restricting member, and
where the clearance is formed between the first restricting member and the rear part of the ferrule and between the second restricting member and the front part of the ferrule.

4. The optical connector according to claim 3, wherein the restrictor of the deformable mechanism includes
a first protrusion formed on an end face of the first restricting member, a first recess formed in the rear part of the ferrule, a second protrusion formed on an end face of the second restricting member, and a second recess formed in the front part of the ferrule, and wherein
the deformation of the deformable mechanism is restricted when the first protrusion is fit into the first recess and the second protrusion is fit into the second recess.

5. The optical connector according to claim 4, wherein the first protrusion, the first recess, the second protrusion, and the second recess extend in a height direction of the ferrule.

6. The optical connector according to claim 4,
wherein two or more of the optical fibers are arranged in the ferrule, and
wherein the first protrusion, the first recess, the second protrusion, and the second recess extend in a direction parallel to alignment of the optical fibers.

7. The optical connector according to claim 3, wherein the beam extends obliquely between the first restricting member and the second restricting member.

8. The optical connects according to claim 3, wherein a guide pin receiving hole is formed in the beam.

9. The optical connector according to claim 8, wherein a diameter of the guide pin a receiving hole formed in the beam is equal to or less than a diameter of a first guide pin receiving hole formed in the rear part of the ferrules, and greater than a diameter of a second guide pin receiving hole formed in the front part of the ferrule.

10. The optical connector according to claim 8, wherein the guide pin receiving hole formed in the beam is offset toward either the first restricting member or the second restricting whichever is positioned closer to the opening.

11. The optical connector according to claim 3,
wherein the beam includes a pair of beam elements connecting between the first restricting member and the second restricting member, and wherein a space for receiving a guide pin is formed between said pair of beam elements.

12. The optical connector according to claim 1,
wherein the front part of the ferrule has a recess in a mating face that is connected to a counterpart connector, and
wherein the optical fiber is optically coupled to an optical fiber of the counterpart connector.

13. The optical connector according to claim 1, wherein the deformable mechanism is N-shaped or Z-shaped in a top view or a vertical cross-section view of the ferrule.

14. The optical connector according to claim 1,
wherein the front part of the ferrule has a fiber guide hole for receiving the optical fiber, and
wherein the optical fiber is retracted from a mating face of the optical connector into the fiber guide hole when the optical connector is disconnected.

\* \* \* \* \*